US012259836B2

(12) United States Patent
Regupathy et al.

(10) Patent No.: US 12,259,836 B2
(45) Date of Patent: Mar. 25, 2025

(54) PEER-INFLUENCED ENHANCED USB POWER DELIVERY

(71) Applicant: Intel Corporation, Santa Clara, CA (US)

(72) Inventors: Rajaram Regupathy, Bangalore (IN); Saranya Gopal, Bangalore (IN); Oren Novitzky, Folsom, CA (US); Tomer Savariego, Lavon (IL); Vrukesh V. Panse, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 17/484,530

(22) Filed: Sep. 24, 2021

(65) Prior Publication Data

US 2023/0096631 A1    Mar. 30, 2023

(51) Int. Cl.
*G06F 13/38*     (2006.01)
*G06F 1/3215*    (2019.01)
*G06F 13/20*     (2006.01)

(52) U.S. Cl.
CPC ......... *G06F 13/382* (2013.01); *G06F 1/3215* (2013.01); *G06F 13/20* (2013.01); *G06F 2213/0042* (2013.01)

(58) Field of Classification Search
CPC ...... G06F 13/382; G06F 13/20; G06F 1/3215; G06F 2213/0042
See application file for complete search history.

(56) References Cited

U.S. PATENT DOCUMENTS

| 2019/0036365 A1* | 1/2019 | Regupathy | H02J 7/00034 |
| 2021/0034127 A1* | 2/2021 | Lee | G06F 13/4295 |
| 2022/0276686 A1* | 9/2022 | Shinoda | G06F 1/28 |

* cited by examiner

*Primary Examiner* — Henry Tsai
*Assistant Examiner* — John B Roche
(74) *Attorney, Agent, or Firm* — NICHOLSON DE VOS WEBSTER & ELLIOTT LLP

(57) ABSTRACT

Universal Serial Bus (USB) Power Delivery is augmented by allowing devices that attach to the USB to include and/or have access to an enhanced device policy manager (eDPM) so that device information such as status, state, or requirements, such as power requirements, may be at least be shared by the eDPMs between, for example, a host device on the bus, a secondary device providing power to devices on the bus, and a new device attaching to the bus. Sharing device information facilitates the host having contextual awareness for the attaching device and assists with determining whether the attaching device may be enumerated on the bus. If not, such as due to insufficient power available from the secondary device, the host and/or secondary device may seek to influence bus devices to change an operating mode to accommodate the attaching device.

20 Claims, 7 Drawing Sheets

PEER-INFLUENCED ENHANCED USB POWER DELIVERY

TECHNICAL FIELD

The present disclosure relates programmable power delivery over a bus, and more particularly to dynamically optimizing power delivery based on power requirements of devices attaching to or detaching from a converged-IO bus.

BACKGROUND AND DESCRIPTION OF RELATED ART

The Universal Serial Bus (USB) Implementers Forum (IF), Inc. (USB-IF) is a consortium of companies that developed and/or support adopting USB technology. Their website states, at Internet Uniform Resource Locator (URL) www.usb.org, the USB-IF "facilitates the development of high-quality compatible USB peripherals (devices), and promotes the benefits of USB and the quality of products that have passed compliance testing." Multiple USB implementations have been standardized by the consortium over the years, a more recent one being referred to as USB4 and Thunderbolt 4 (developed by Intel Corporation and adopted by the USB-IF), both of which provide up to 40 Gbps peak data throughput, and many converged-IO features. There are multiple different versions/features provided by different USB versions. Thunderbolt 4 can be generally thought of as a comprehensive implementation of USB4 where all high performance features/options are provided/enabled. For the purposes of discussion, reference to "USB" will, unless stated otherwise or required otherwise by context, assume a high performing bus, e.g., such as one implementing Thunderbolt 4, all features of USB4, or the like.

Various devices will be discussed below operating in the context of the USB Power Delivery (USB-PD) Specification, a standard provided by the USB-IF. The USB-PD Specification introduces the concept of a Programmable Power Supply (PPS) option, where a Power Data Object (PDO) is used by a power supply whose output voltage can be programmatically incrementally adjusted over its advertised range. The USB-PD specification recommends that increasing or decreasing programmable power shall be interactive with system and device policy, but does not define the parameters to the policy and leaves implementation to system designers and peer systems. According to the definition of the USB-PD Specification, a power sink operating in the PPS mode periodically sends Request Message within "tPPSRequest" even if its request is unchanged with a max time limit of 10 seconds. This leads to ambiguity of what system change increase or decreases the programmed power requirement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
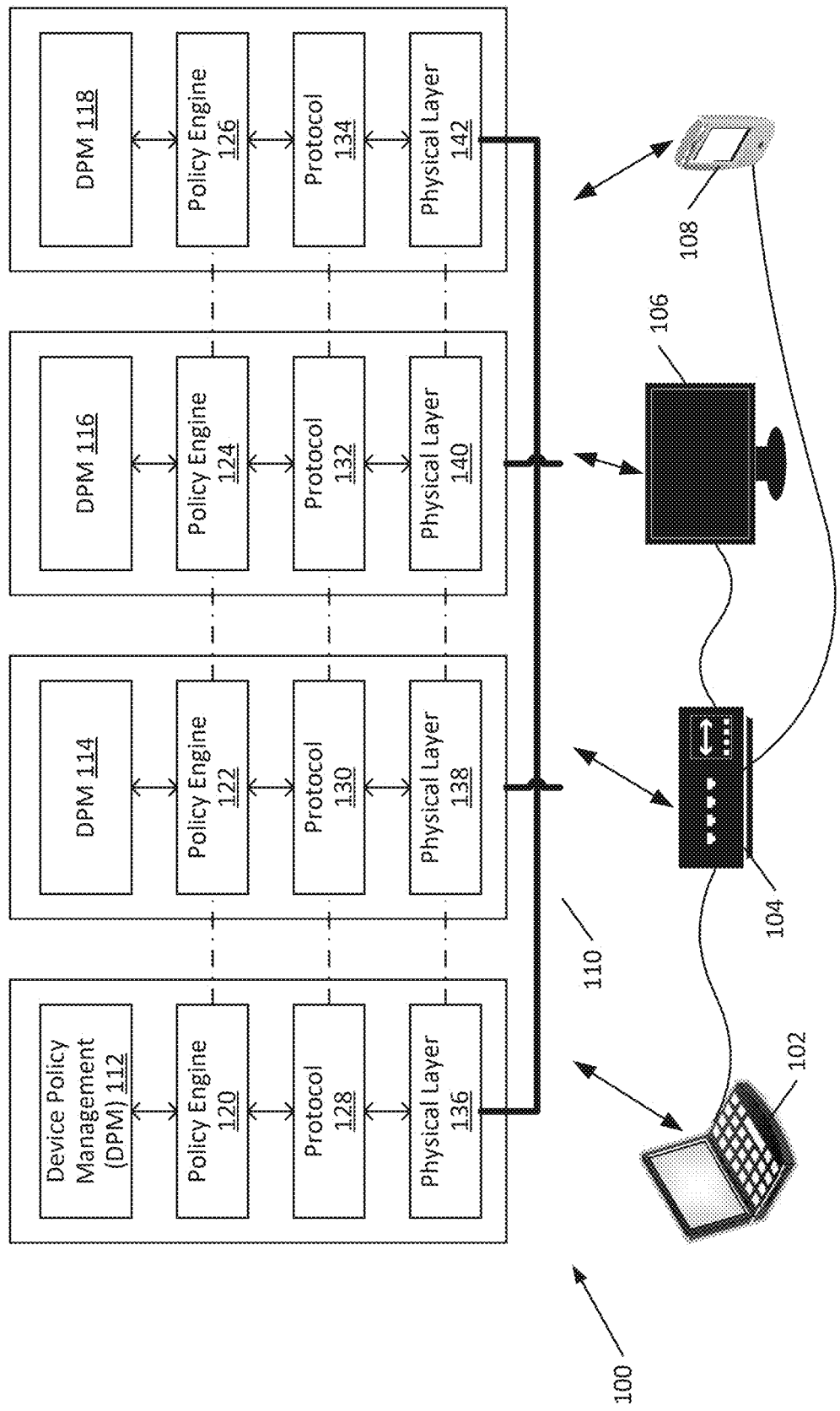
FIG. 1 illustrates an exemplary universal serial bus (USB) environment.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

Universal Serial Bus (USB) Power Delivery is augmented by allowing devices that attach to the USB to include and/or have access to an enhanced device policy manager (eDPM) so information such as status, state, or requirements, such as power requirements, may be shared between devices and/or eDPMs. It will be appreciated different devices may be coupled to a USB, where any device may be designated the host system, e.g., a laptop computer, desktop computer, server, etc. Other devices may be attached as well, such as a docking solution, which may provide power over the USB to the host system or other devices attached to the USB. A dock providing power, but present on the USB as a secondary device, faces a problem of needing to provide power over the USB, while lacking insight into the power needs of attached devices.

As attached devices transition into different power states depending on their activity, power needs often fluctuate, but the dock may be unable to accommodate and/or respond to power need transitions. This typically requires static allocations of the maximum possible power a device might draw from one of its connections (constant voltage mode), even if currently needed power is less than what is available. This may lead to an artificial denial of service to a new device because a static power allocation has insufficient power available for a new device, when actual power requirements actually allows for adding the new device. Sharing device information facilitates the host having contextual awareness for the attaching device and assists with determining whether the attaching device may be enumerated on the bus. If not, such as due to insufficient power available from the secondary device, the host and/or secondary device may seek to influence bus devices to change an operating mode to accommodate the attaching device.

FIG. 1 illustrates an exemplary universal serial bus (USB) environment 100 showing exemplary devices 102-108 connected to a USB 110. As illustrated, there may be multiple devices, which may be, for example, a laptop 102, a power source (e.g., a docking station (dock), hub, or the like) 104, a self-powered device (e.g., a monitor) 106, and a power sink (e.g., a phone) 108. It will be appreciated there may be multiple ones of these devices, or other devices (not illustrated) that are coupled to the USB 110. Assuming the dock has multiple ports to accommodate the illustrated devices and perhaps has open port to accommodate future connection of other devices, the dock cannot currently effectively design and/or implement a power policy that is reflective of the actual power needs of the devices 102-108 requiring power (the dock 104 is included in power needs since it itself requires power). FIG. 1 illustrates a Universal Serial Bus point-to-point connection. Each of the devices 102-108 is assumed to provide, in accord with the USB Power Delivery (USB-PD) specification, a device policy manager (DPM) 112-118, where a DPM is an independent entity specific to its associated device, and there is no logical connection between the DPMs 112-118 when there is a bus connection between the respective devices.

The DPM of each device communicates with its respective port through the layers of the USB-C specification. The USB-PD specification also defines a policy engine 120-126, protocol layer 128-134, and a physical layer 136-142. The physical layer encompasses the physical medium of communication between the port and the DPM as well as low level communication related to power delivery such as the configuration of resistance levels (e.g., Rp and Rd) on the physical medium. The protocol layer defines messaging between the port and the DPM that enables the DPM to negotiate allotted power levels for the devices attached to the port . The policy engine implements basic USB-PD management specific to the corresponding port. The DPM controls the allotment and management of power across the available ports in the system. The DPM handles management of the power role, power policy, multiple port monitoring and power requirements balancing across the available ports. The DPM monitors batteries and AC power supplies and manages alternate modes of operation . Thus, the DPM can manage connection, disconnection , power distribution or enabling functionalities and may be controlled and managed by software.

If the power source (item 104) is a secondary device, e.g., it is not the laptop device 102 or other device which will be designated a host since the laptop is a computer and the power source is considered a simpler "secondary" device presumed lacking the general purpose capabilities of a computer, the power source lacks ecosystem/system knowledge of a host with disconnected DPM. That is, since the power supply is not a host, and since the coupled devices 102-108 are not communicating with each other or the power source, the power source lacks information about the power status of the coupled devices.

This also leads to multiple implementation concerns alluded to above, of which an exemplary few are that when the power source (item 104) is a secondary device, e.g., it is not the laptop device 102 which would be designated a, the power source lacks ecosystem/system knowledge of a host with disconnected Device Policy Management (DPM).

That is, since the power supply is not a host, and the device policy management (DPM) features of coupled devices 102-108 are not communicating with each other or the power source, the power source lacks information about the power status of the coupled devices and power delivery cannot be adjusted according to the actual needs of coupled devices. While the USB-IF provides for programmable power, the definition is loosely defined, lacking a link with system (or systemic) behavior or usage scenarios. For example, assume FIG. 1 item 102 is an Ultrabook laptop using USB4, and FIG. 1 item 104 is a docking solution for port expansion, and as a power source for connected peripherals (coupled devices). Typically, most coupled devices are power sinks, and display devices, e.g., FIG. 1 item 106, are self-powered and/or act as an additional power source. Since USB-PD Device Policy Manager (DPM) of each of the FIG. 1 devices 102-108 are disconnected, a "secondary device" (USB4 dock) acting as center of power structure does not have adequate information to define and control with an efficient power policy for the currently connected devices.

For example, if in FIG. 1 the laptop 102 is connected to a USB4 dock, e.g., item 104, the power negotiated would be the peak power requirement, which the laptop may not always use. The laptop or other device may only require higher power when, for example, the system load is high, or during an initial battery charging phase. The power supply (e.g., the USB4 dock) cannot take advantage of such occasional-peak, thus requiring it to statically allocate (and hence statically block) a power reserve that may only be occasionally needed. This is an inefficient management of a system resource. Similarly, the dock has to statically reserve its power for all the downstream ports without the knowledge of the port's "function" entering low power mode. This is a side effect of dock acting as a "secondary device" unaware of port power polices that may be known to the designated host device, e.g., the laptop. This lack of knowledge of the upstream and downstream ports of a secondary device, such as the hub powering some or all of the devices, leads to inefficient power reserve management, in turn leading to higher costs and reduced energy conservation.

Figure 3:
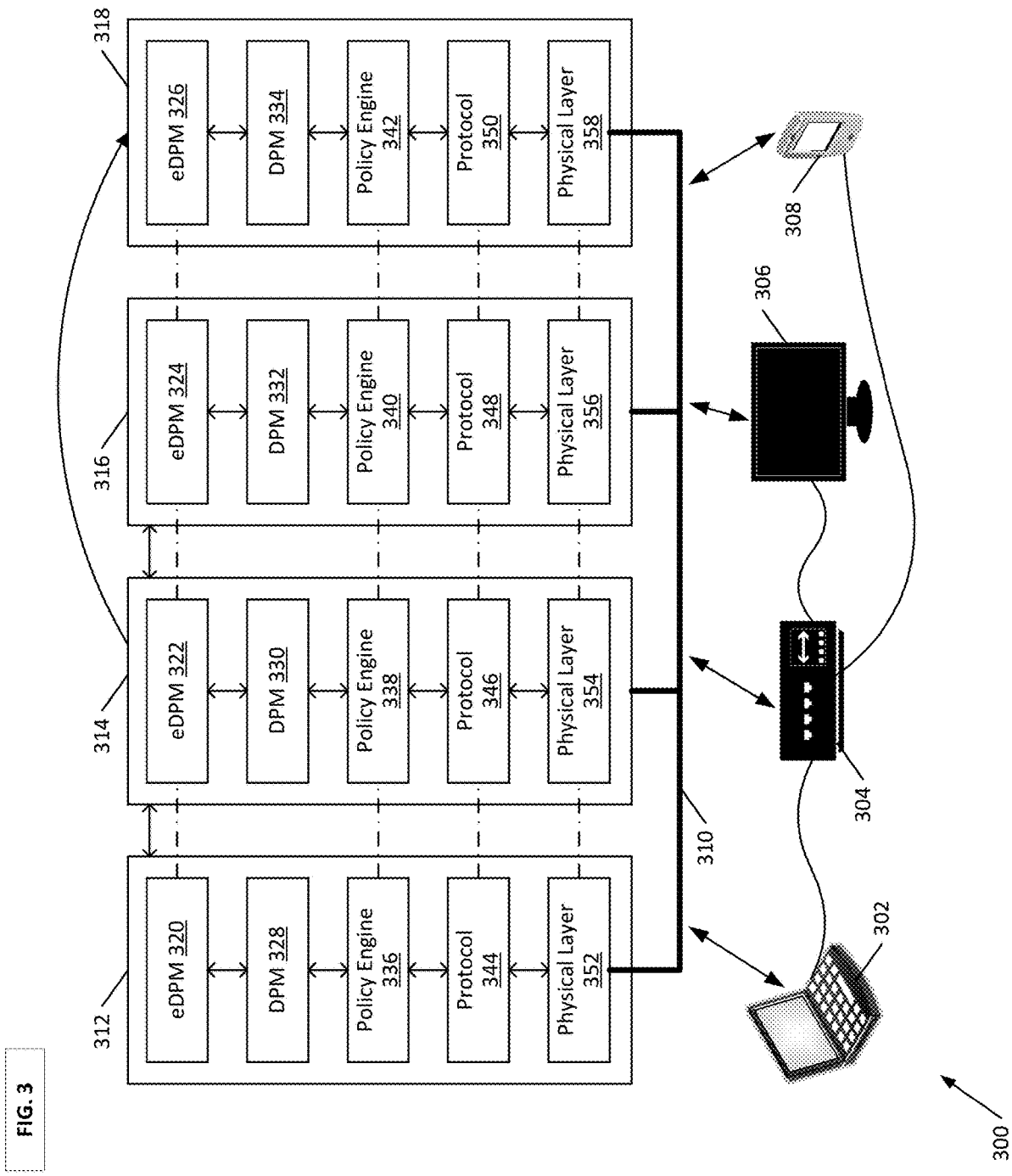
FIG. 3 illustrates an exemplary implementation of an extended device policy management.

To address the lack of ecosystem knowledge being shared by devices on a bus, such as a USB4/USB-C bus, enhanced policy management will be provided so devices coupled to a bus may build an enhanced integrated power policy between a primary host, such as the FIG. 3 laptop 302, and secondary devices, such as the FIG. 3 dock 304, monitor 306, phone 308, etc.

Figure 2:
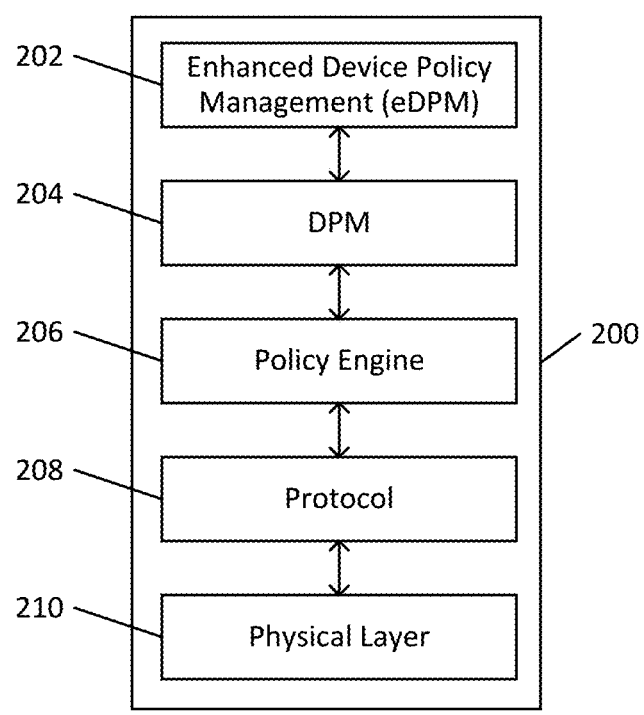
FIG. 2 illustrates a USB management stack 200 according to an exemplary implementation.

FIG. 2 illustrates a USB management stack 200 according to an exemplary implementation. As illustrated, there is an extended device policy management (eDPM) layer 202 stacked above a DPM 204, policy engine 206, protocol 208 and physical layer 210. Each device coupled to a common bus (see, e.g., FIG. 3 items 302-308), such as a bus operating in accord with the USB Power Delivery (USB-PD) specification. For example, in one embodiment, a bus architecture is provided that combines multiple protocols (USB, PCIe, DP, host-to-host, etc.) onto a single physical interface so that the total speed and performance of, for example, a USB4 fabric, can be dynamically shared not just between USB devices, but also PCIe or DP end-points. The total bandwidth will change over time, and for example, may be assumed for purposes of discussion to be 40 Gbps (Gen 3×2) over a Type-C connector. It will be appreciated this speed is exemplary and that other bus configurations, and future buses, may have ever increasing speeds and changes to connector types. The principles disclosed herein will be appreciated to be bus and connector agnostic. USB4/USB-C are used as a well-known implementation environment for expository convenience.

In one embodiment, a dock, e.g., a USB4 or Thunderbolt 4 (TBT4) dock, is enumerated on a bus as a secondary device, and also acting as a power source, e.g., with a 180 W power supply to power a laptop along with other devices that may be attached to the bus (see, e.g., FIG. 3 items 302-308). It will be appreciated the wattage is arbitrary and the dock may provide other outputs higher or lower than this example. In one embodiment, the dock may be configured to perform multiple-stage power scaling by expanding a DPM 204 with an extended DPM (eDPM) 202 by building ecosystem knowledge to assist with managing a power budget for the hub at least in part by peer influence. To do so, for example, the power source eDPM of the dock may establish a logical relation with peer DPMs (provided by other devices coupled to the bus) through communication with eDPMs provided by the other devices on the bus. Once the logical relation is established, then power policies of primary (e.g., the FIG. 3 host laptop 302) and secondary devices (e.g., FIG. 3 items 304-308) may be dynamically adjusted based at least in part on peer influence, e.g., knowledge of current power needs of devices coupled to the bus.

FIG. 3 illustrates an exemplary implementation 300 of an extended device policy management (eDPM) in which the FIG. 2 extended device policy management (eDPM) is applied. In this exemplary implementation, a laptop 302, hub/dock 304 enumerated as a secondary device and acting as a power source, and other secondary devices, e.g., a monitor 306, and smart phone 308, are coupled to a bus 310 such as one operating in accord with the USB Power Delivery (USB-PD) specification, from the USB-IF, where the hub operates as a Power Data Object (PDO) with providing Programmable Power Supply (PPS) features and/or capabilities to devices coupled to the USB. It will be appreciated that the term hub is used herein to generally represent any device, such as a dock or other device, that presents on a common bus as a secondary device, but is providing power to one or more device also attached to the bus.

As illustrated, the hub 304 may establish a logical relation with peer devices 302, 306, 308 by querying the coupled devices to build a power profile and advertise eDPM policy power profiles to the power sink, e.g., the hub may announce on the bus it supports eDPM and devices able to take advantage of it should respond. Subsequently, the hub's eDPM may dynamically change power profiles by at least measuring, for example, system load conditions on the hub, and influencing the power need of peer devices. The hub's system load may be measured, for example, by function state of an attached device. The function state may be determined by inspection of the attached device's eDPM/DPM status and/or by announcement data received by the hub from the attached device. In addition and/or alternatively, the hub's system load may also be determined by the hub sampling power used by attached devices. In one embodiment, if an upstream facing port (UFP) is a power sink, it may renegotiate with the hub 304 (as a secondary device acting as power source), based on either the hub's functional state, power requirement and/or the UFP power sink's functional state or power requirement.

That is, in various embodiments, either the hub or connected device may initiate a dynamic power profile change in accord with changing conditions in the hub and/or devices attached to the hub. It will be appreciated the hub will ultimately decide, as the power source, whether a particular change may occur/is supported by power available to attached devices. Note that since devices, such as a monitor, may be self-powered as well as operate as a power source. In one embodiment, a self-powered device may provide power to some coupled devices and thus coordinate with a hub to offload power provision requirements of the hub. In some exemplary implementations, the hub may direct, advise and/or control the self-powered device's providing power to coordinate power deliver to attached devices as well as to maintain a consistent knowledge of power profiles across coupled devices.

Consider an example where the computer 302 is a power sink UFP, such as an Ultrabook computer having power requirements that change based on its system load. The Ultrabook may, for example, employ different power modes, e.g., PL1 through PL4. The Ultrabook is assumed to be enumerated as a host system, and may renegotiate a lower power profile with the hub as needed to track its PL1 through PL4 transitions. Similarly, when a power sink (a UFP), such as the smart phone 308, external disk drive, or other secondary device are enumerated on the USB, the host system may negotiate a lower power for these devices instead of using statically reserved power. The host may also renegotiate power requirements when, for example, a power provider, e.g., a downstream facing port (DFP), disconnects or enters a low power mode, as well as when a UFP device disconnects. Note a UFP or DFP may operate as a dual role port (DRP) and switch between operating as a UFP and DFP.

By allowing power source(s), e.g., a hub, to influence and/or be influenced by USB coupled devices, there may be a dramatic reduction in watts saved. For example there may be a 180 W to 110 W reduction when using, for example, the Intel Goshen Ridge controller/chipset. There may also be a reduction in equipment design costs if the hub is not expected to provide a maximum theoretical power output all of the time, and there may be a reduction in power conversion losses by not having to provide more power availability than is actually needed.

In contrast with FIG. 1 device policy management (DPM) 112-118 being unable to share and/or peer-influence power states of other devices, as illustrated in FIG. 3, the extended DPM (eDPM) 320-326 are communicatively coupled to allow data sharing so that devices 302-308 coupled by way of the bus 310 (or other communication medium) may influence power states of other devices. In one exemplary implementation, a USB-PD Device Policy Manager (e.g., of the hub 304) is enhanced with peer influence to form an extended DPM and to minimize the power requirement of a power source. In the illustrated embodiment, a logical connection is established between all the modules of an illustrated USB stack 312-318. The connection between the DPM/eDPM is a one-to-many relationship and the other modules (policy engine, protocol and physical layer) are peer-to-peer as defined in the USB-PD specification. The one-to-many relationship may be enabled by use of the bus 310 and/or a second communication medium enabling direct communication between the eDPM modules.

With the hub/power source being a secondary device in the illustrated ecosystem, as discussed above it does not have ecosystem knowledge as would a host device. The hub may start with a query of its ports to preliminarily identify power needs of devices connected to it. This facilitates the hub/power source creating logical connections by way of the ePDMs communicating with each other, even if the hub is enumerated on the bus 310 as a secondary device. The hub may develop an extended policy which is based on querying upstream facing port (UFP) and downstream facing port (DFP) power needs. In some embodiments, the hub, as a secondary device acting as a power source, and lacking data on the functional power requirements of a DFP device, may measure power consumption by sampling the DFP, snooping a router controller state, or use other techniques to obtain consumption data.

It will be appreciated an eDPM 320-326 may be used in the USB stacks 312-318, without having to depart from otherwise standard implementations of the DPM 328-334, policy engine 336-342, protocol 344-350, and physical layer 352-358, where the eDPM operates to provide data to and/or receive data from the other stack layers and thus transparently integrate a device into the illustrated enhanced environment. In alternate implementations, it will be appreciated the other stack layers may be aware of the eDPM and power ecosystem concerns. It will be appreciated that while the eDPM and DPM are illustrated as separate items in the illustrated stacks, the eDPM may be incorporated into the DPM.

Figure 4:
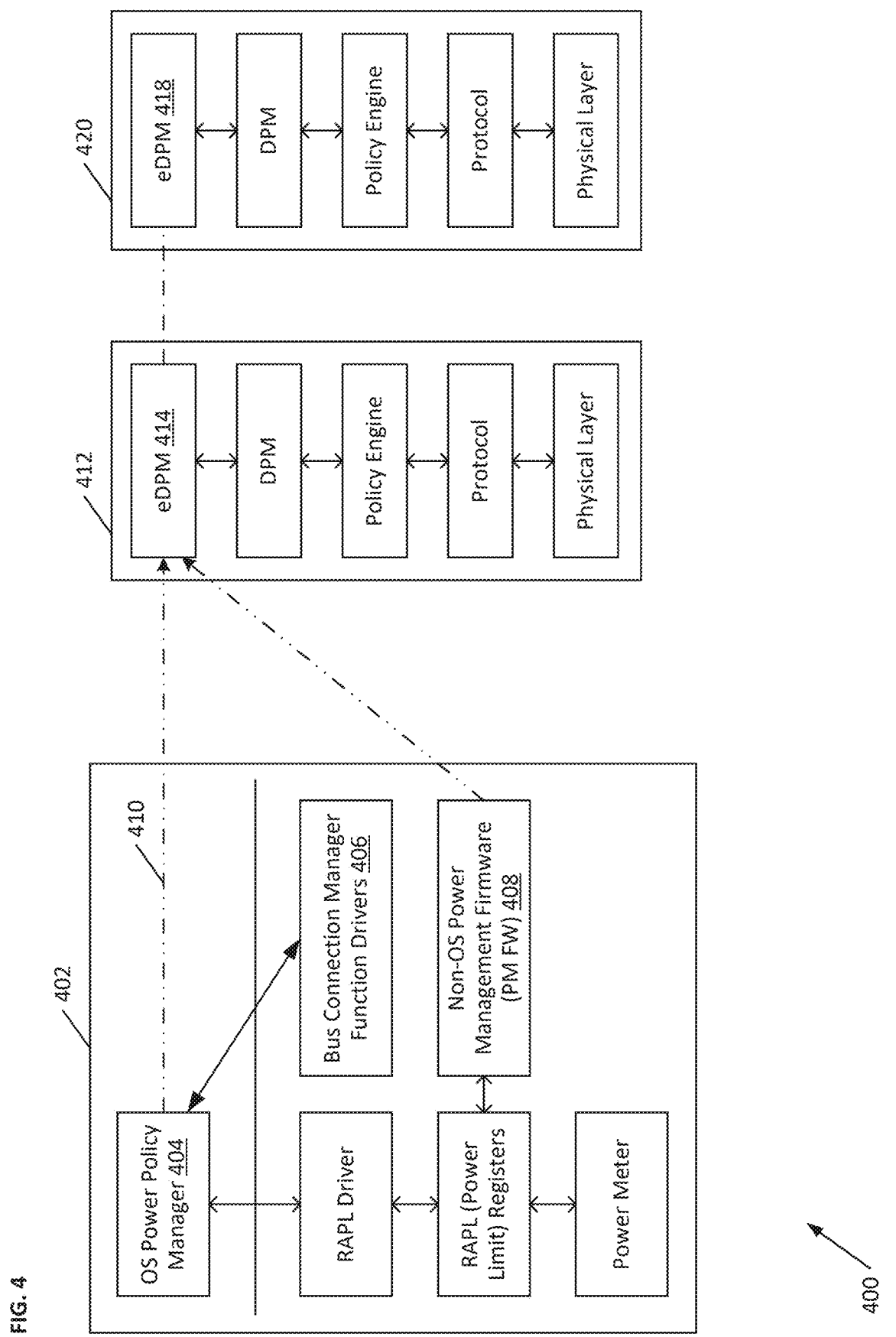
FIG. 4 is a diagram according to one exemplary implementation, illustrating operation of an extended device policy management of a secondary device providing power.

FIG. 4 is a diagram 400 according to one exemplary implementation, illustrating operation of an extended device policy management (eDPM) of a secondary device providing power, e.g., the FIG. 3 eDPM 322 of hub 304. The flow diagram may be implemented within a System on a Chip (SoC) 402 accessible to and/or providing an operating system (OS) control for the secondary device. In one embodiment, the secondary device utilizes an OS power policy manager 404 of the host system which may be implemented in a variety of ways, such as with a user space daemon, system process, or other hardware and/or software construct monitoring user preferences, system loads, functional state of downstream facing port (DFP) devices, etc.

A power policy manager 404, as discussed above, may determine power levels of the secondary device (or power to be made available from the secondary device) based on, for example, bus connection manager function drivers 406. These drivers are responsible for enumerating devices attaching/detaching from the bus. In the illustrated embodiment, the bus is assumed compliant/supporting USB4 features/functionality, but other buses may, of course, be used. In the illustrated embodiment, Intel Running Average Power Limit (RAPL) technology may be utilized. RAPL provides, among other things, access to power meter functionality. It will be appreciated RAPL is presented as one example, and other power measuring technology may be used; the teachings herein are not reliant on RAPL. The power policy manager may also determine power levels of the secondary device based on a system power load, which for example, may be identified with the non-OS power management firmware (PM FW) 408.

Thus, in the illustrated embodiment, a FIG. 3 hub 304/ secondary device may communicate 410 with another device's USB stack 412 eDPM 414, to get current power needs for that device, or to prompt the device to shift (if possible) to a lower power state. This enables a secondary device, such as the hub, to manage power requirements needed from hub and/or to accommodate devices seeking to attach to or detach from the bus, e.g., FIG. 3 bus 310. Alternatively, or in addition to communication 410 with the eDPM 414, the bus may directly measure power use by an attached device and communicate with its eDPM 414 to establish power policies for the attached device and/or the secondary device and other devices that may be attached to a shared bus. Note while it has been described as if the hub directly communicates with attached devices eDPMs, it will be appreciated eDPMs 414, 418 of two device USB stacks 412, 420 may also directly communicate power state, power needs, power transitions, etc. Power state/power profile information may thus be directly and/or indirectly available to the hub to enable it to more efficiently establish power policies among devices.

Please note that for expository convenience the illustrations herein are a simplified presentation of hardware and/or software and/or communication between devices and/or device components. In particular, to simplify presentation, missing from drawings are, for example, firmware and/or other hardware and/or software that may be present in an implementation of the devices discussed herein.

Figure 5:
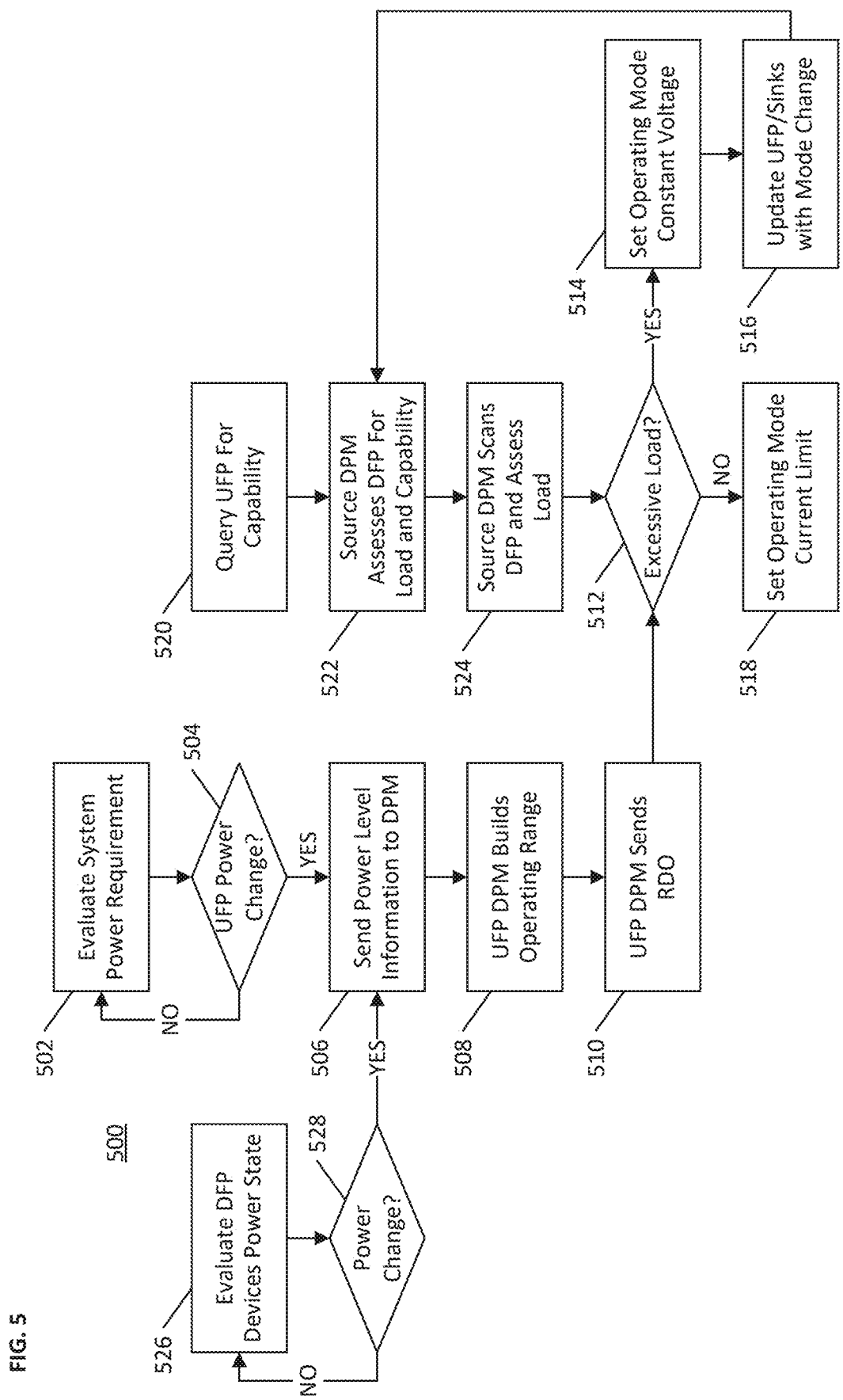
FIG. 5 is an exemplary flowchart illustrating extended device power management operations by USB Power Delivery devices engaging in peer-influencing of device power policies.

FIG. 5 is an exemplary flowchart 500 illustrating extended device power management (eDPM) operations by USB Power Delivery (PD) devices engaging in peer-influencing of device power policies. A first operation may be to evaluate 502 the system power requirement, e.g., evaluate the Intel Running Average Power Limit (RAPL) information for devices attached to a secondary device, e.g., the FIG. 3 hub 304, providing power to attached devices. As discussed above, the hub may use RAPL or some other technique to sample/assess the power needs of connected devices, and compare that to the needs of devices that are newly coupled/ decoupled to the hub. If 504 there has been a power change, such as an upstream facing port (UFP) (power sink) having a power state change (which may reflect power needs going up as well as down), an operating system (OS) policy may send 506 the detected power level information to the DPM of the UFP that experienced the power state change.

In response to the sending 506, the UFP device's DPM may build 508 a request data object (RDO) (defined in the USB-PD Specification) with the operating range determined at least in part on the evaluated 502 system power requirement. The UFP DPM may send 510 its RDO to the secondary device providing power, e.g., the FIG. 3 hub 304. The hub may then check if the total load on the hub is within its power supply limits, or if it exceeds its limits. If 512 the load is excessive, then the hub may set 514 its operating mode to constant voltage. That is, if it cannot meet the needs of the device, it may operate as if it were not dynamically optimizing power output and coordinating power policies of attached devices, and set its output (at least for that device) to its maximum possible output. The hub may then update 516/notify attached UFPs/power sinks with the hub's mode change. This allows a host device, e.g., the FIG. 3 laptop 302, to adjust its power state responsive to the hub notification of an excessive load. For example, if the issue arose from attempting to attach another monitor, the excessive load may notify the host and the host will fail to activate/not enumerate the monitor and/or provide an error. If 512 the load is not excessive, then the hub may set 518 its operating mode to the current limit required of the connected devices plus additional power as needed for itself and/or other known requirements.

As discussed above, the hub (a secondary device providing power) may evaluate 502 the load of connected devices.

It will be appreciated in accord with the USB-PD Specification, an initial PD contract is established with an upstream facing port (UFP) when it is attached to the hub/power source. Assuming the hub and UFP implement eDPM, after the PD contract is formed, the hub may query 520 the UFP, e.g., a power sink such as FIG. 3 smart phone 308, for its load capability. The hub's device power management (DPM) functionality may assess 522 the downstream facing port (DFP) current load and capability, e.g., determine its maximum power output and current load. The hub's DPM may then assess 524 the power load on the hub, such as through power sensing functionality provided by RAPL or other load sensing technology. The hub may then determine if 512 the power requirement of the UFP, in comparison to the source load and power ability, represents and excessive load.

If 512 so, the hub may set its operating mode 514, 518 as discussed above. When there is an excessive load and the hub sets 514 itself to constant voltage mode, and updates 516 UFPs with its mode change/mode setting, handling may loop back to the hub's DPM assessing 522 its current load and capability. It will be appreciated power requirements of a DFP and UFP may be constantly changing and hence the hub will continue to adapt to power needs of attached devices. In one embodiment, the source may evaluate 526 the DFP devices functional state/power state to determine if there is a state chang. If 528 there has been a DFP function device power state change, then as discussed above, the source may send 506 the detected power level information to the DPM of the UFP that experienced a power change.

Figure 6:
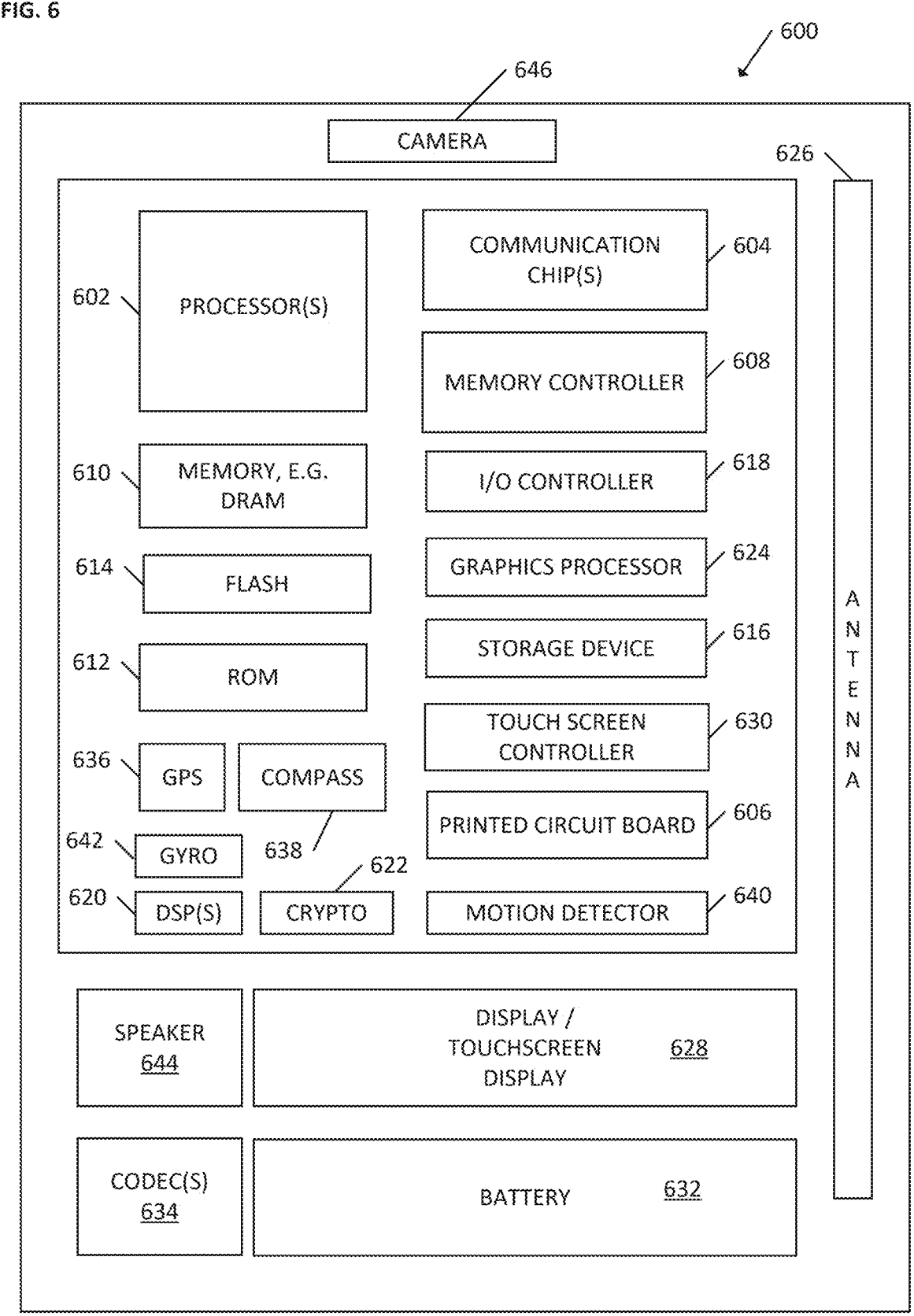
FIG. 6 illustrates an exemplary computer device, in accord with various embodiments, that may employ the apparatuses and/or methods described herein.

FIG. 6 illustrates an exemplary computer device 600, in accordance with various embodiments, that may employ the apparatuses and/or methods described herein for FIGS. 2-5. As shown, computer device 600 may include a number of components, such as one or more processor(s) 602 (one shown) and at least one communication chip(s) 604. In various embodiments, the one or more processor(s) each may include one or more processor cores. In various embodiments, the at least one communication chip may be physically and electrically coupled to the one or more processor(s). In further implementations, the communication chip(s) may be part of the one or more processor(s). In various embodiments, computer device 600 may include printed circuit board (PCB) 606. For these embodiments, the one or more processor(s) and communication chip(s) may be disposed thereon. In alternate embodiments, the various components may be coupled without the employment of PCB 606.

Depending on its applications, computer device 600 may include other components that may or may not be physically and electrically coupled to the PCB 606. These other components include, but are not limited to, memory controller 608, volatile memory (e.g., dynamic random access memory (DRAM) 610), non-volatile memory such as read only memory (ROM) 612, flash memory 614, storage device 616 (e.g., a hard-disk drive (HDD)), an I/O controller 618, a digital signal processor 620, a crypto processor 622, a graphics processor 624 (e.g., a graphics processing unit (GPU) or other circuitry for performing graphics), one or more antenna 626, a display which may be or work in conjunction with a touch screen display 628, a touch screen controller 630, a battery 632, one or more codec(s) 634, e.g., an audio codec, a video codec, a bus management codec, OS policy manager codec, etc., a positioning system such as a global positioning system (GPS) device 636 (it will be appreciated other location technology may be used, including location services provided by software operating within computer device 600 and/or in combination with location estimation services), a compass 638, a motion/movement detector 640, e.g., an accelerometer and/or other devices to detect motion in one or more axes, real and/or relative movement through space, etc., a gyroscope 642, a speaker 644, a camera 646, and other mass storage devices (such as hard disk drive, a solid state drive, compact disk (CD), digital versatile disk (DVD)) (not shown), and so forth.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

In some embodiments, the one or more processor(s) 602, flash memory 614, and/or storage device 616 may include associated firmware (not shown) storing programming instructions configured to enable computer device 600, in response to execution of the programming instructions by one or more processor(s), to practice all or selected aspects of the methods described herein. In various embodiments, these aspects may additionally be or alternatively be implemented using hardware separate from the one or more processor(s), flash memory, or storage device(s). In one embodiment, memory, such as flash memory or other memory in the computer device, is or may include a memory device that is a block or byte addressable memory device, such as those based on NAND, NOR, Phase Change Memory (PCM), nanowire memory, and other technologies including future generation nonvolatile devices, or a combination of any of the above, or other memory. The memory device may refer to the die itself and/or to a packaged memory product.

In various embodiments, one or more components of the computer device 600 may implement an embodiment of the FIG. 3 devices 302-308, etc. Thus for example the one or more processor(s) 602 could be the processor of a downstream facing port (DFP) (power source) or upstream facing port (UFP) (power sink) communicating with memory 610 though memory controller 608. In some embodiments, I/O controller 618 may interface with one or more external devices to receive a data, such as over a wired and/or wireless bus, including the Universal Serial Bus. Additionally, or alternatively, the external devices may be used to receive a data signal transmitted between components of the computer device 600.

The communication chip(s) 604 may enable wired and/or wireless communications for the transfer of data to and from the computer device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device may include a plurality of communication chips 604. For instance, a first communication chip(s) may be dedicated to shorter range wireless communications such as Wi-Fi and Bluetooth, or other standard or proprietary shorter range communication technology, and a second communication chip 604 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example the communication chip(s) may support RoCE (Remote Direct Memory Access (RDMA) over Converged Ethernet), which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANs), parallel computing using RDMA, Internet Wide Area Remote Protocol (iWARP), InfiniBand Architecture (IBA), and other such technology. Computer device 600 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 600 may be any device implementing the extended device policy management (eDPM) or the dynamic adjustment of downstream facing port (DFP)/upstream facing port (UFP) power states disclosed herein, such as a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console, automotive entertainment unit, etc.), a digital camera, an appliance, a portable music player, or a digital video recorder, or a transportation device (e.g., any motorized or manual device such as a bicycle, motorcycle, automobile, taxi, train, plane, drone, rocket, etc.). It will be appreciated computer device 600 is intended to be any electronic device that processes data.

Figure 7:
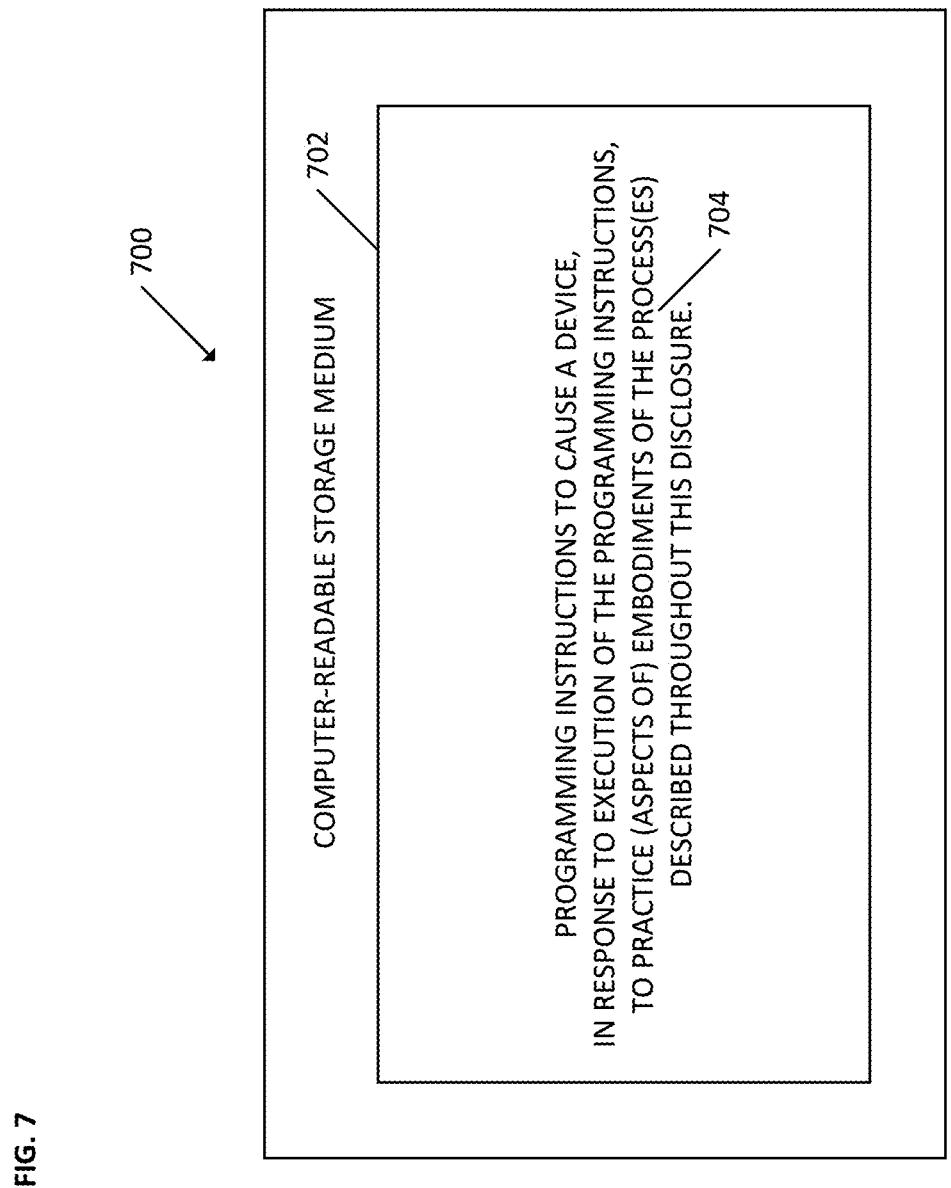
FIG. 7 illustrates an exemplary computer-readable storage medium.

FIG. 7 illustrates an exemplary computer-readable storage medium 700. The storage medium may be transitory, non-transitory or a combination of transitory and non-transitory media, and the medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 702 may include a number of programming instructions 704. Programming instructions 704 may be configured to enable a device, e.g., computer device 600, in response to execution of the programming instructions, to implement (aspects of) the extended device policy management (eDPM) or the dynamic adjustment of downstream facing port (DFP)/upstream facing port (UFP) power states. In alternate embodiments, programming instructions 704 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may be one or more non-transitory computer readable media (CRM) comprising instructions for participating in a managed converged-IO Universal Serial Bus (USB) in which at least one or more devices coupled to the USB (coupled devices) have an extended device policy manager (DPM) to facilitate the participating, the instructions, when executed, provide for: identifying a first device operating as a power sink and having a first extended DPM; identifying a second device operating as a power source and having a second extended DPM to be at least intermittently communicatively coupled to at least the first device; dynamically identifying power requirements for the coupled devices based at least in part on data accessible by way of the first and second extended DPMs; establishing a power policy for the coupled devices based at least in part on the power requirements; and programming the second device to deliver power to the coupled devices in accord with the power policy.

Example 2 may be the CRM of Example 1, the instructions including further instructions to provide for: identifying a third device operating as a power sink and having a third extended DPM to be at least intermittently communicatively coupled to at least the first device; determining a power requirement for the third device; associating the power requirement with the third extended DPM; dynamically updating power requirements for the coupled devices based at least in part on data accessible by way of the third extended DPM; and influencing power states in coupled devices based at least in part on the updated power requirement to facilitate reducing overall power requirement for the coupled devices.

Example 3 may be the CRM of any of Examples 1-2, the instructions including further instructions to provide for: dynamically identifying power requirements of a set of recipient devices receiving power from the second device; and advertising an extended DPM ecosystem to at least the recipient devices; wherein the recipient devices are configured to automatically change a power profile based at least in part on a load associated with at least one of the recipient devices, and provide access to data identifying the power profile.

Example 4 may be the CRM of any of Examples 1-3, the instructions including further instructions to provide for: establishing an initial power policy for each of the coupled devices; wherein the first device performs the establishing the power policy and the programming the second device to deliver power.

Example 5 may be the CRM of any of Examples 1-4, the instructions including further instructions to provide for: determining a topology for the coupled devices based at least in part on a logical relation between the coupled devices; monitoring changes to the topology; dynamically determining an updated power policy based at least in part on the monitored changes to the topology; and programming the second device to deliver power in accord with the updated power policy.

Example 6 may be the CRM of Example 5, the instructions include further instructions to provide for a change to the topology, wherein the change comprises a selected one or more of: a change in a power requirement for at least one of the coupled devices, a new device coupled to the USB, or a known device disconnect from the USB.

Example 7 may be the CRM of any of Examples 1-6, the instructions including further instructions to provide for: the first device is classified as a host device; and the second device is classified as a secondary device, and dynamically provides power to the first device.

Example 8 may be a method for participating in a managed Universal Serial Bus (USB) providing dynamically adjusting power delivery over the USB, in which at least one or more devices coupled to the USB (coupled devices) have an extended device policy manager (DPM) to facilitate influencing the power delivery, comprising: identifying a first device operating as a power sink and having a first extended DPM; identifying a second device operating as a power source and having a second extended DPM to be at least intermittently communicatively coupled to at least the first device; dynamically identifying power requirements for the coupled devices based at least in part on data accessible by way of the first and second extended DPMs; establishing a power policy for the coupled devices based at least in part on the power requirements; and programming the second device to deliver power to the coupled devices in accord with the power policy.

Example 9 may be the method of Example 8, further comprising: identifying a third device operating as a power sink and having a third extended DPM to be at least intermittently communicatively coupled to at least the first device; determining a power requirement for the third device; associating the power requirement with the third extended DPM; dynamically updating power requirements for the coupled devices based at least in part on data accessible by way of the third extended DPM; and influencing power states in coupled devices based at least in part on the updated power requirement to facilitate reducing overall power requirement for the coupled devices.

Example 10 may be the method of any of Examples 8-9, the further comprising: dynamically identifying power requirements of a set of recipient devices receiving power from the second device; and advertising an extended DPM ecosystem to at least the recipient devices; wherein the recipient devices are configured to automatically change a power profile based at least in part on a load associated with at least one of the recipient devices, and provide access to data identifying the power profile.

Example 11 may be the method of any of Examples 8-10, further comprising: establishing an initial power policy for each of the coupled devices; wherein the first device performs the establishing the power policy and the programming the second device to deliver power.

Example 12 may be the method of and of Examples 8-11, further comprising: determining a topology for the coupled devices based at least in part on a logical relation between the coupled devices; monitoring changes to the topology; dynamically determining an updated power policy based at least in part on the monitored changes to the topology; and programming the second device to deliver power in accord with the updated power policy.

Example 13 may be the method of Example 12, wherein a change to the topology includes a selected one or more of: a change in a power requirement for at least one of the coupled devices, a new device coupled to the USB, or a known device disconnect from the USB.

Example 14 may be the method of any of Examples 8-13, wherein: the first device is classified as a host device; and the second device is classified as a secondary device, and dynamically provides power to the first device.

Example 15 may be a system comprising at least one processor, a memory for storing at least instructions for participating in a managed Universal Serial Bus (USB), and a USB connection to facilitate the system to communicate with devices coupled to the USB (coupled devices) that have an extended device policy manager (DPM) facilitating their participating in the managed USB, the instructions, when executed by the at least one processor, provide for performing any of Examples 8-14.

Example 16 may be an apparatus comprising at least one processor, a memory for storing instructions to be executed by the at least one processor, a Universal Serial Bus (USB) connection for use when participating in a managed converged-IO USB, and an enhanced device policy manager to facilitate communicating over the USB with enhanced device policy managers of other devices participating in the managed USB, the memory storing instructions that when executed by the at least one processor provide for performing the recited operations of any of Examples 8-14.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. One or more non-transitory computer readable media (CRM) comprising instructions for participating in a managed converged-IO Universal Serial Bus (USB) in which at least one or more devices coupled to the USB (coupled devices) have an extended device policy manager (DPM) to facilitate the participating, the instructions, when executed, provide for:
   identifying a first device operating as a power sink and having a first extended DPM;
   identifying a second device operating as a power source and having a second extended DPM to be at least intermittently communicatively coupled to at least the first device;
   dynamically identifying power requirements for the coupled devices based at least in part on data accessible by way of the first and second extended DPMs;
   establishing a power policy for the coupled devices based at least in part on the power requirements; and
   programming the second device to deliver power to the coupled devices in accord with the power policy.

2. The CRM of claim 1, the instructions including further instructions to provide for:
   identifying a third device operating as a power sink and having a third extended DPM to be at least intermittently communicatively coupled to at least the first device;
   determining a power requirement for the third device;
   associating the power requirement with the third extended DPM;
   dynamically updating power requirements for the coupled devices based at least in part on data accessible by way of the third extended DPM; and
   influencing power states in coupled devices based at least in part on the updated power requirement to facilitate reducing overall power requirement for the coupled devices.

3. The CRM of claim 1, the instructions including further instructions to provide for:
   dynamically identifying power requirements of a set of recipient devices receiving power from the second device; and
   advertising an extended DPM ecosystem to at least the recipient devices;
   wherein the recipient devices are configured to automatically change a power profile based at least in part on a load associated with at least one of the recipient devices, and provide access to data identifying the power profile.

4. The CRM of claim 1, the instructions including further instructions to provide for:
   establishing an initial power policy for each of the coupled devices;
   wherein the first device performs the establishing the power policy and the programming the second device to deliver power.

5. The CRM of claim 1, the instructions including further instructions to provide for:
   determining a topology for the coupled devices based at least in part on a logical relation between the coupled devices;
   monitoring changes to the topology;
   dynamically determining an updated power policy based at least in part on the monitored changes to the topology; and
   programming the second device to deliver power in accord with the updated power policy.

6. The CRM of claim 5, the instructions including further instructions to provide for a change to the topology, wherein the change comprises a selected one or more of:
 a change in a power requirement for at least one of the coupled devices,
 a new device coupled to the USB, or
 a known device disconnect from the USB.

7. The CRM of claim 1, the instructions including further instructions to provide for:
 the first device is classified as a host device; and
 the second device is classified as a secondary device, and dynamically provides power to the first device.

8. A system comprising at least one processor, a memory for storing at least instructions for participating in a managed Universal Serial Bus (USB), and a USB connection to facilitate the system to communicate with devices coupled to the USB (coupled devices) that have an extended device policy manager (DPM) facilitating their participating in the managed USB, the instructions, when executed by the at least one processor, provide for:
 identifying a first device operating as a power sink and having a first extended DPM;
 identifying a second device operating as a power source and having a second extended DPM to be at least intermittently communicatively coupled to at least the first device;
 dynamically identifying power requirements for the coupled devices based at least in part on data accessible by way of the first and second extended DPMs;
 establishing a power policy for the coupled devices based at least in part on the power requirements; and
 programming the second device to deliver power to the coupled devices in accord with the power policy.

9. The system of claim 8, in which the USB provides a converged-IO bus, and wherein the instructions including further instructions to provide for:
 identifying a third device operating as a power sink and having a third extended DPM to be at least intermittently communicatively coupled to at least the first device;
 determining a power requirement for the third device;
 associating the power requirement with the third extended DPM;
 dynamically updating power requirements for the coupled devices based at least in part on data accessible by way of the third extended DPM; and
 influencing power states in coupled devices based at least in part on the updated power requirement to facilitate reducing overall power requirement for the coupled devices.

10. The system of claim 8, the instructions including further instructions to provide for:
 dynamically identifying power requirements of a set of recipient devices receiving power from the second device; and
 advertising an extended DPM ecosystem to at least the recipient devices;
 wherein the recipient devices are configured to automatically change a power profile based at least in part on a load associated with at least one of the recipient devices, and provide access to data identifying the power profile.

11. The system of claim 8, the instructions including further instructions to provide for:
 establishing an initial power policy for each of the coupled devices;
 wherein the first device performs the establishing the power policy and the programming the second device to deliver power.

12. The system of claim 8, the instructions including further instructions to provide for:
 determining a topology for the coupled devices based at least in part on a logical relation between the coupled devices;
 monitoring changes to the topology;
 dynamically determining an updated power policy based at least in part on the monitored changes to the topology; and
 programming the second device to deliver power in accord with the updated power policy.

13. The system of claim 12, the instructions include further instructions to provide for a change to the topology, wherein the change comprises a selected one or more of:
 a change in a power requirement for at least one of the coupled devices,
 a new device coupled to the USB, or
 a known device disconnect from the USB.

14. The system of claim 8, the instructions including further instructions to provide for:
 the first device is classified as a host device; and
 the second device is classified as a secondary device, and dynamically provides power to the first device.

15. A method for participating in a managed Universal Serial Bus (USB) providing dynamically adjusting power delivery over the USB, in which at least one or more devices coupled to the USB (coupled devices) have an extended device policy manager (DPM) to facilitate influencing the power delivery, comprising:
 identifying a first device operating as a power sink and having a first extended DPM;
 identifying a second device operating as a power source and having a second extended DPM to be at least intermittently communicatively coupled to at least the first device;
 dynamically identifying power requirements for the coupled devices based at least in part on data accessible by way of the first and second extended DPMs;
 establishing a power policy for the coupled devices based at least in part on the power requirements; and
 programming the second device to deliver power to the coupled devices in accord with the power policy.

16. The method of claim 15, further comprising:
 identifying a third device operating as a power sink and having a third extended DPM to be at least intermittently communicatively coupled to at least the first device;
 determining a power requirement for the third device;
 associating the power requirement with the third extended DPM;
 dynamically updating power requirements for the coupled devices based at least in part on data accessible by way of the third extended DPM; and
 influencing power states in coupled devices based at least in part on the updated power requirement to facilitate reducing overall power requirement for the coupled devices.

17. The method of claim 15, further comprising:
 dynamically identifying power requirements of a set of recipient devices receiving power from the second device; and
 advertising an extended DPM ecosystem to at least the recipient devices;

wherein the recipient devices are configured to automatically change a power profile based at least in part on a load associated with at least one of the recipient devices, and provide access to data identifying the power profile.

18. The method of claim 15, further comprising:
establishing an initial power policy for each of the coupled devices;
wherein the first device performs the establishing the power policy and the programming the second device to deliver power.

19. The method of claim 15, further comprising:
determining a topology for the coupled devices based at least in part on a logical relation between the coupled devices;
monitoring changes to the topology;
dynamically determining an updated power policy based at least in part on the monitored changes to the topology; and
programming the second device to deliver power in accord with the updated power policy;
wherein the change comprises a selected one or more of: a change in a power requirement for at least one of the coupled devices, a new device coupled to the USB, or a known device disconnect from the USB.

20. The method of claim 15, further comprising:
the first device is classified as a host device; and
the second device is classified as a secondary device, and dynamically provides power to coupled devices based at least in part on an influence received from the first device.

* * * * *